J., W. H. & E. R. WILLIAMS.
DISINFECTOR AND DEODORIZER.
APPLICATION FILED JUNE 9, 1910.
977,353.
Patented Nov. 29, 1910.
2 SHEETS—SHEET 1.
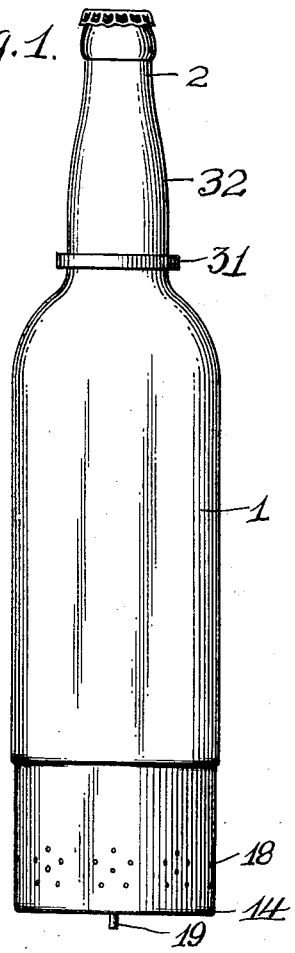
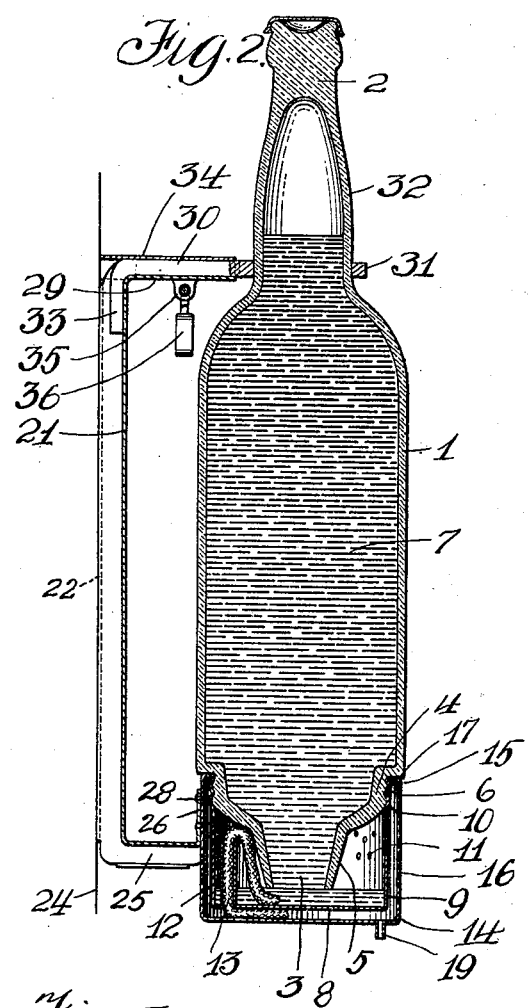
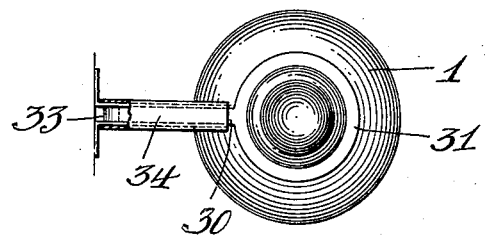
WITNESSES
Samuel Payne
R. H. Butler
INVENTORS
Joseph Williams
W. H. Williams
E. R. Williams
by
Attorneys.

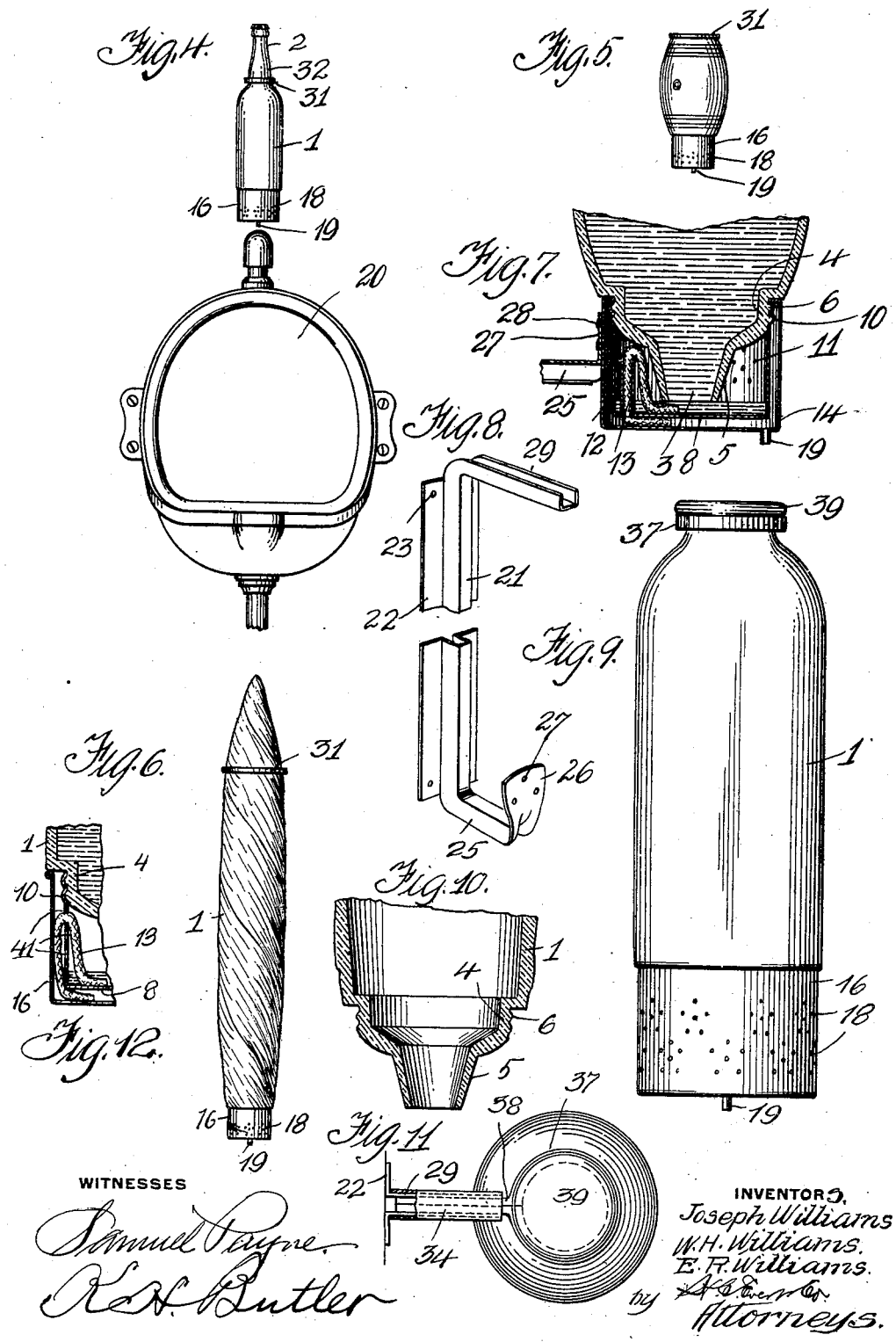

UNITED STATES PATENT OFFICE.

JOSEPH WILLIAMS, WILLIAM H. WILLIAMS, AND EDWARD R. WILLIAMS, OF SHARPSBURG, PENNSYLVANIA.

DISINFECTOR AND DEODORIZER.

977,353.   Specification of Letters Patent.   Patented Nov. 29, 1910.

Application filed June 9, 1910. Serial No. 565,913.

*To all whom it may concern:*

Be it known that we, JOSEPH WILLIAMS, WILLIAM H. WILLIAMS, and EDWARD R. WILLIAMS, citizens of the United States of America, residing at Sharpsburg, in the county of Allegheny and State of Pennsylvania, have invented certain new and useful Improvements in Disinfectors and Deodorizers, of which the following is a specification, reference being had therein to the accompanying drawing.

This invention relates to disinfectors and deodorizers, and the objects of our invention are, first, to provide a receptacle with positive and reliable means for automatically and intermittently discharging portions of the contents thereof; second, to provide a receptacle for disinfectants and deodorants of a shape similar to an article of commerce or of a contour similar to a bottle, jar, keg or a receptacle containing an article of commerce whereby the receptacle will constitute an advertising medium; third, to furnish novel means for supporting a receptacle containing disinfectants and deodorants, and fourth, to accomplish the above results by a mechanical construction that is strong, durable, easy to install and inexpensive to manufacture. The above and such other objects as may hereinafter appear are attained by the novel construction, combination and arrangement of parts to be hereinafter specifically described and then claimed.

Reference will now be had to the drawings forming a part of this specification, wherein:—

Figure 1 is a front elevation of the disinfector and deodorizer, Fig. 2 is a vertical sectional view of the same, Fig. 3 is a plan of the disinfector and deodorizer, partly broken away and partly in section, Fig. 4 is a front elevation of the disinfector and deodorizer in position above a urinal, the disinfector and deodorizer having the shape of a bottle, Fig. 5 is a front elevation of the disinfector and deodorizer having the shape of a keg or barrel, Fig. 6 is a similar view of the disinfector and deodorizer having the shape of a cigar, Fig. 7 is an enlarged vertical sectional view of the lower portion of the disinfector and deodorizer having the contour of a barrel, Fig. 8 is a perspective view of a portion of a bracket adapted to support the disinfector and deodorizer, Fig. 9 is an enlarged front elevation of a modified form of receptacle for disinfectants and deodorants, Fig. 10 is a vertical sectional view of a portion of the receptacle having a contour similar to a cigar, Fig. 11 is a plan of a modified form of retaining ring, and Fig. 12 is a vertical sectional view of a portion of a modified form of inner cup.

Like numerals of reference denote corresponding views through the several views of the drawings.

The reference numeral 1 denotes a disinfectant and deodorant receptacle of a contour similar to that of a bottle and the object of making the receptacle of this shape is to employ the same as an advertising medium for well known brands of liquids or other products and to provide the receptacle with labels or other advertising matter, thus giving the receptacle the appearance of bottles that are well known as articles of commerce. It is with this same object in view that the receptacle can be made of a shape similar to a keg or barrel, as shown in Fig. 5 or similar in shape to a cigar, as shown in Fig. 6.

The upper end of the receptacle 1 is closed, as at 2 and the lower end thereof is provided with a central outlet 3, the central outlet 3 being formed by reducing the lower end of the receptacle 1 first as indicated at 4 and second as at 5, the first reduction in the diameter of the receptacle providing an annular wall 6 removed from the periphery of the receptacle 1, and this wall is threaded for a purpose that will presently appear. The second reduction 5 forms the outlet 3 and provides clearance for a wick casing and wick used in connection with the receptacle.

7 denotes a disinfectant and deodorant within the receptacle 1, and the disinfectant and deodorant is retained therein by an inner cup-shaped shell or cup 8 having the walls 9 thereof threaded at the upper edges, as at 10 whereby the cup can be screwed upon the threaded annular walls 4 of the receptacle 1. The walls 9 of the cup 8 are perforated or apertured, as at 11 at a point above the outlet 3 of the receptacle 1.

12 denotes a vertical wick casing carried by the bottom of the cup 8 contiguous to the wall 9 thereof, said wick casing having both ends thereof open with the upper end in proximity to the reduced lower end of the receptacle 1. In the wick casing 12 is arranged a wick 13 having the upper end thereof extending downwardly into the cup 8 and on to the bottom thereof at a point below the outlet 3, while the other end of the wick extends from the lower open end of the casing 12 in order that by capillary attraction the contents of the cup 8 will be conveyed from said cup.

14 denotes an outer cup-shaped shell or cup of a depth and diameter greater than the cup 8 and of a less diameter than the receptacle 1, whereby the receptacle 1 can be supported upon the upper edges 15 of the walls 16 of said cup, the receptacle 1 being supported by the annular shoulder 17 formed in reducing the lower end of the receptacle 1, as at 4. The walls 16 of the cup 14 are perforated or apertured, as at 18 and the bottom of the cup 14 adjacent to the wall thereof is provided with an open drip tube 19, this tube being arranged at a point removed from the lower end of the wick 13, thus preventing a match, pin or other device being inserted in the drip tube 19 to tamper with the wick 13.

To support the receptacle 1 and the outer cup 14 above a urinal 20, basin or other structure or place to be disinfected and deodorized, a bracket is employed for attaching the receptacle and cup to a suitable support. The bracket is preferably made of channel shaped metal and comprises a vertical body 21 having lateral side flanges 22 extending from one end of said body to the opposite end thereof, these flanges being apertured, as at 23 whereby they can be secured to a support 24 by screws, nails or other fastening means. The lower end of the body 21 terminates in an outwardly projecting arm 25 having the end thereof shaped and bent upwardly, as at 26 and apertured, as at 27 whereby it can be secured to the side of the outer cup 14 by rivets 28 or other fastening means. The upper end of the body 21 terminates in an outwardly extending support 29 adapted to receive the angle arm 30 of a ring or collar 31 mounted upon the neck 32 of the receptacle 1. The angle end 33 extends downwardly in the body 21 of the bracket and said arm is retained in the support 29 by an inverted channel shaped keeper 34 having depending apertured and oppositely disposed lugs 35 adapted to be connected beneath the support 29 by a padlock or seal 36. In lieu of the ring or collar 31 a split ring 37 can be used having the ends thereof provided with arms 38 similar to the arm 30.

In Fig. 9 of the drawings another form of receptacle 1 is shown wherein the neck of said receptacle is provided with a rim 39 and adapted to engage under this rim is the split ring 37, the ring being sprung over the upper end of the receptacle 1.

When the disinfector is used as a deodorizer of the atmosphere only, the wick 13 or the drip tube 19 might be dispensed with and the atmosphere surrounding the deodorizer disinfected by the process of evaporation which is carried into effect through the medium of the perforations of the inner and outer cups.

In Fig. 12 of the drawings there is shown a modified form of inner and outer cups wherein the wick casing 12 is dispensed with and communication between the cups had by means of one or more openings 41 in the side wall of the inner cup, whereby the wick 13 can be placed to convey the contents of the inner cup by capillary attraction to the outer cup. With the wick placed in the lowermost opening the flow would be faster than if the wick was placed in the upper opening owing to the fact that the fluid has a greater distance to travel, and it is through the medium of these openings that the flow of fluid can be regulated.

From the foregoing it will be observed that the receptacle 1 constitutes a reservoir and the lower end of said reservoir is provided with inner and outer cups, the former retaining the contents of the reservoir in position to be fed by capillary attraction to the latter, and this outer cup serving functionally as a shield for the inner cup and as a support for the receptacle or reservoir. The atmosphere is disinfected by the process of evaporation at the same time that the urinal is being disinfected through the constant dripping of the disinfectant from the drip tube 19. It will be noted that through the medium of the wick casing 12, containing the wick 13 being placed at a point removed from the drip tube 19, the disinfectant must travel some distance or across the outer cup, consequently there will be a shallow quantity in the outer cup and it is this small quantity and the circulation of atmosphere caused by effecting the discharge from the receptacle 1 to the inner cup 8 that makes it unnecessary to use evaporating wicks or padding as commonly used in disinfecting devices.

Having now described our invention what we claim as new, is:—

1. A device for the purpose set forth comprising a receptacle constituting a reservoir, said receptacle having an outlet at its lower end, an inner cup surrounding said outlet and engaging said receptacle at a point above said outlet and depending below said outlet, said inner cup being provided with a series of openings in the side walls at a point above said outlet, an outer cup surrounding said inner cup and having openings in its side walls, a tube arranged within said inner cup to establish communication between said cups, and a wick within said tube whereby the contents of said inner cup may be discharged into said outer cup by capillary attraction.

2. A device for the purpose set forth comprising a receptacle constituting a reservoir, said receptacle having an outlet at its lower end, an inner cup surrounding said outlet and engaging said receptacle at a point above said outlet and depending below said outlet, said inner cup being provided with a series of openings in the side walls at a point above said outlet, an outer cup surrounding said inner cup and having openings in its side walls, a tube arranged within said inner cup to establish communication between said cups, a wick within said tube whereby the contents of said inner cup may be discharged into said outer cup by capillary attraction, and means for discharging the contents of said outer cup at a point removed from the communication between said inner cup and said outer cup.

3. A device for the purpose set forth comprising a bracket, an outer cup carried by the lower end of said bracket, a receptacle supported by said outer cup and having the lower end thereof provided with an outlet, an inner cup detachably mounted upon the lower end of said receptacle, means for conveying the contents of said inner cup into said outer cup, and means for detachably connecting the upper end of said receptacle to the upper end of said bracket.

In testimony whereof we affix our signatures in the presence of two witnesses.

JOSEPH WILLIAMS.
WILLIAM H. WILLIAMS.
EDWARD R. WILLIAMS.

Witnesses:
   JOHN G. WALTER,
   ROBT. A. SAINT.